United States Patent

[11] 3,540,616

[72] Inventor Harold F. Thompson
 St. Paul, Minnesota
[21] Appl. No. 786,257
[22] Filed Dec. 23, 1968
[45] Patented Nov. 17, 1970
[73] Assignee Minnesota Mining and Manufacturing
 Company
 St. Paul, Minnesota
 a corporation of Delaware

[54] FILM CARTRIDGE SHIPPING CONTAINER
 2 Claims, 5 Drawing Figs.
[52] U.S. Cl. .................................................. 220/20,
 206/52, 220/22
[51] Int. Cl. ................................................... B65d 85/67,
 B65d 25/10
[50] Field of Search .......................................... 220/4, 4E,
 20, 22; 206/52F, 59E

[56] References Cited
 UNITED STATES PATENTS
 2,481,095 9/1949 Essman ....................... 206/52(F)
 2,703,645 3/1955 Scrimshaw .................. 206/65(B)UX
 2,935,190 5/1960 Braun .......................... 206/52(F)
 3,273,700 9/1966 Moreau et al. ................ 220/20X
 3,297,153 1/1967 Fattori ......................... 206/52(F)
 3,441,128 4/1969 Goldberg ..................... 206/52(F)

Primary Examiner—George E. Lowrance
Attorney—Kinney, Alexander, Sell, Steldt and Delahunt ABSTRACT: A tough polymeric film cartridge shipping-container having ribbed floor pieces bonded to the end walls of telescopically mating traylike body and cover pieces to strengthen the container and to divide it into compartments. The container having a belt surrounding the body and cover pieces within an inset channel to hold the container together during shipment, and having a transparent window behind which an address label may be protectively retained.

Patented Nov. 17, 1970 3,540,616

INVENTOR.
HAROLD F. THOMPSON
BY Kinney, Alexander,
Sell, Steldt & DeLaHunt
ATTORNEYS

FILM CARTRIDGE SHIPPING CONTAINER

This invention relates to an improved lightweight durable film cartridge shipping-container in which one to eight film cartridges having a length of film wound on a reel enclosed therein may be shipped without being damaged and in which an address label and a belt holding the container together are protected during shipment.

It has recently been found advantageous to package reels of film, especially microfilm, in rectangular plastic cartridges which protect the film and provide convenient storage and handling units for the film. After the film has been drawn from the cartridge and exposed, it is rewound therein for shipment to a central processing station for developing and then is shipped back to the consumer. To provide an economical shipping-container, it is advantageous to package a number of the cartridges in a single container. The cartridges must be tightly packed or separated in the container or they may collide during shipment with a sufficient force to chip pieces of plastic from the cartridges. These plastic chips may then get into the cartridges and damage the film.

Numerous prior art inventions have realized the advantage of dividing a container into compartments to provide separation of the articles to be shipped. Thus in U.S. Pat. No. 3,147,929 there is disclosed a two-piece container formed with ribs and in U.S. Pat. No. 3,381,873 there is disclosed a boxlike container having an insert formed with recesses for individually suspending articles. Prior art inventions such as that disclosed in U.S. Pat. No. 3,163,289 have also shown that the volume of a container can be increased while providing protection for articles by forming the body and cover so that they are telescopically mating.

However, these prior art inventions have generally required that the container be made of a polymeric foam or fiber board to reduce its weight and thereby the shipping costs while sacrificing durability, or they have accepted the higher shipping cost to attain durability. Furthermore, the prior art inventions do not provide protection for the address label which may become unreadable by handling before the container reaches its destination. The durability of prior art inventions utilizing a belt to hold the container pieces together is also reduced since the belt is exposed above the surface of the container and it may become severely abraded by being slid across rough surfaces during shipment.

It is an object of the present invention to provide a lightweight durable film cartridge shipping-container in which film cartridges are either separated and/or packed tightly together with large surfaces contacting. It is a further object to provide a shipping container in which an address label is protected during shipment. A still further object is to provide a shipping-container in which a belt used to hold the container halves together is protected from abrasion all about the container during shipment.

The novel features and advantages of the present invention will become apparent after reading the following description which refers to the accompanying drawing wherein.

Figure 1:
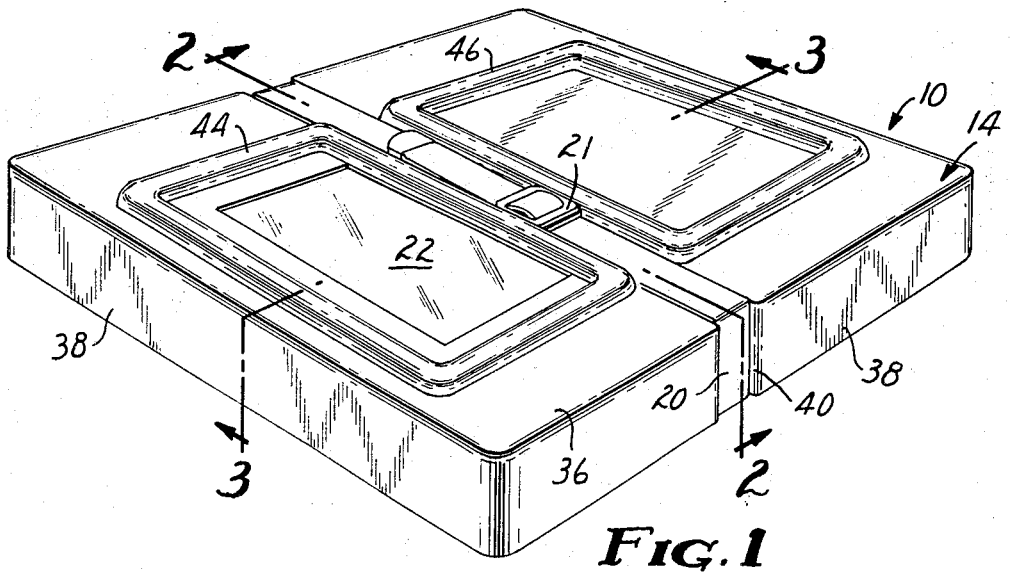
FIG. 1 is a perspective view of a shipping container made in accordance with the present invention.
Figure 2:
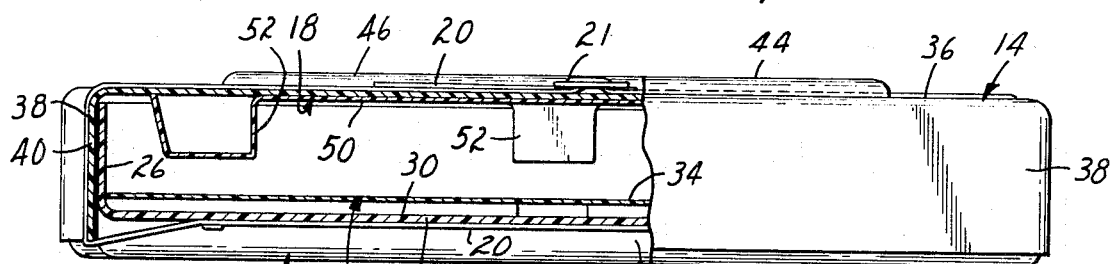
FIG. 2 is an enlarged sectional view taken along line 2-2 of FIG. 1 with parts thereof shown in elevation.
Figure 3:
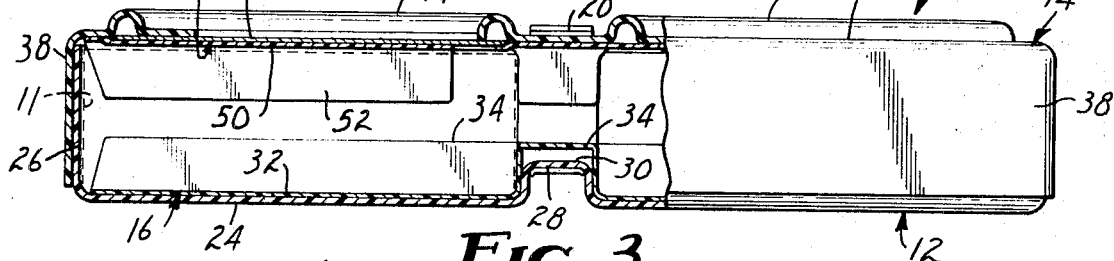
FIG. 3 is an enlarged sectional view taken along line 3-3 of FIG. 1 with parts thereof shown in elevation.
Figures 4, 5:
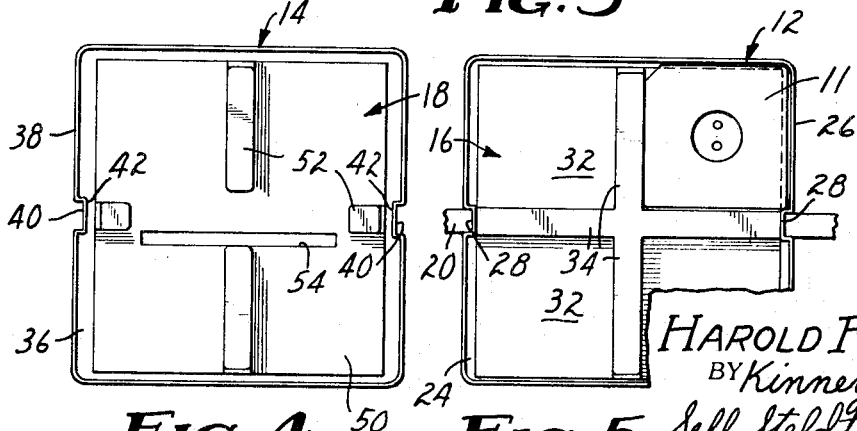
FIG. 4 is an interior view of the container cover.
FIG. 5 is an interior view of a substantial portion of the container body.

The shipping container, generally designated 10, of the present invention consists of telescopically mating body 12 and cover 14 pieces, ribbed lower and upper floor pieces 16 and 18, a belt 20 and a transparent window 22.

The body piece 12 is preferably formed from a sheet of a lightweight weight durable plastic, e.g. "Royalite 26", made by U.S. RUbber Co., Mechanical Goods Division with offices at Rockefeller Center, New York, New York 10020, or an equivalent polymeric material, and it may be formed by vacuum molding. It has a traylike construction with a generally rectangular end wall 24 and side walls 26 extending perpendicularly from the end wall 24 a distance at least equal to the thickness of a film cartridge 11. The area bounded by sidewalls 26 is designated the interior of the body piece 12. A generally rectangular inset embossed channel 28 is formed in the exterior of the end wall 24 and two opposed sidewalls 26 midway of the length of those sidewalls. A generally rectangular rib is thereby produced in the interior of body piece 12 and divides it into two equal parts.

The lower floor piece 16 is preferably formed of the same material as body piece 12 and it may be formed in the same manner. It is formed with a rectangular generally planar base 32 having dimensions generally equal to body piece end wall 24 and a pair of generally rectangular perpendicularly intersecting ribs 34 that extend across the base 32 from midway of its edges. These ribs 34 are formed with a height generally equal to one-half the height of sidewalls 26. The base 32 of lower floor piece 16 is secured to the body piece end wall 24, for example by an adhesive, with one of the intersecting ribs 34 extending over the end wall rib 30. The intersecting ribs 34 then divide the end wall 24 into four equal areas or compartments. The widths of the ribs 34 are varied with the dimensions of the body piece end wall to make the dimensions of these compartments equal to the dimensions of the cartridges 11 to be shipped.

The cover piece 14 is preferably formed from the same material and in the same manner as the body piece. It has a traylike construction with a rectangular top wall 36 and sidewalls 38 extending perpendicularly from the top wall 36 a distance at least equal to the thickness of a film cartridge 11. The cover piece top wall 36 has dimensions larger than those of the body piece end wall 24 so that the body piece sidewalls 26 will fit within the area bounded by the cover piece sidewalls 38 to form a telescoping container. The area bounded by sidewalls 38 is designated the interior of the cover piece. Generally rectangular inset embossed channels 40 are formed in the exterior of the two opposed sidewalls 38 which are adjacent the sidewalls 26 formed with channel 28 when the body piece 12 and cover piece 14 are assembled and telescoped to form the container. These channels 40 are formed midway along the lengths of the sidewalls 26 with a lesser depth and width than the channel 28 so that the ribs 42 produced in the interior of the cover piece when forming channels 40 may slide freely in the body piece channel 28 as the container is telescoped.

A pair of ribs 44 and 46 semicircular in cross section are embossed in the cover piece top wall 36 so that they are raised above the exterior surface of the cover piece 14. Each of these ribs 44 and 46 closes upon itself to border a rectangular area on the cover piece 14. The edges of these ribs 44 and 46 which are nearest each other border a path across the cover joining and having the same width as the channels 40 in sidewalls 38. The area enclosed by rib 46 may be used for affixing postage stamps and/or handling instructions and they will be protected by the rib 46 from being accidentally removed during shipment.

A substantial amount of the cover piece top wall 36 is removed from the rectangular area enclosed by semicircular rib 44 and it is replaced by a transparent panel 22. Preferably this panel 22 is larger than the opening in the top wall 36 and is secured around its edges to the interior of the top wall 36, for example, by an adhesive, to completely cover the opening and thereby to prevent dust from entering the container during shipment. It is also preferred that this panel 22 be a piece of transparent plastic having a coefficient of expansion similar to that of other portions of the cover piece 14 so that it will not separate from the top wall 36 when the container 10 is exposed to changes in temperature.

The upper floor piece 18 is preferably formed of the same material as the cover piece 14 and it may be formed in the same manner. It is formed with a rectangular generally planar base 50 having dimensions generally equal to those of the lower floor piece 16 and rectangular partial ribs 52. Except for the fact that these ribs 52 are of shorter length and, therefore, do not intersect, they are formed to be the same as the intersecting ribs 34 of the lower floor piece 16. The upper floor piece base 50 is centered on the cover piece top wall 36 and it is secured thereto, for example, by an adhesive, except in the area in which it contacts the transparent panel 22. A slot or aperture 54 is made in the upper floor piece base 50 along the edge of transparent panel 22 nearest the center of the top wall 36 to provide access to the space between the transparent panel 22 and the upper floor piece 18. An address label can then be inserted into this space from the interior of the cover piece 14 and it will be protected from defacement during shipment.

The belt 20 is preferably formed of cloth having a width generally equal to the width of channel 28 and a length sufficient to pass around the container and overlap itself when the container 10 is telescoped. Secured to one of its free ends is a buckle 21 which may securely join the ends of the belt 20 around the container 10 during shipment. The belt 20 is secured within the channel 28 in the exterior of the body piece end wall 24, for example by rivets, with approximately equal lengths of the belt 20 extending from opposite ends of the end wall channel 28.

In use, one to four film cartridges 11 may be placed in the compartments on the lower floor piece 16. An additional one to four cartridges may be stacked one on and aligned with one of the cartridges resting on lower floor piece 16.

A shipping address card or label is inserted through the aperture in the upper floor piece 18 with the address thereon facing the transparent panel 22 so that it may be read from the exterior of cover piece 14. Shipping instructions and/or postage stamps may also be affixed to the exterior of cover piece 14 within the area bounded by semicircular rib 46.

The cover piece 14 is then placed over the body piece 12 so that the upper and lower floor piece ribs 34 and 52 face each other and the cover piece sidewall channels 40 are aligned with the body piece sidewall channels 28. The cover piece 14 is then pushed down onto the body piece 12 so that the cover piece sidewalls 38 overlap the body piece sidewalls 26. If one to four cartridges are placed in the container 10, the cover piece sidewalls 38 will completely overlap the body piece sidewalls 26 while if five to eight cartridges are to be shipped the container will be telescoped so that the cover piece sidewalls 38 only partially overlap the body piece sidewalls.

The ends of belt 20 are then pulled over the cover piece 14 to surround the container 10 within channels 28 and 40 and between the semicircular ribs 44 and 46 on the exterior of the cover piece 14. The ends of belt 20 are then joined together by buckle 21. The channels 28 and 40 and semicircular ribs 44 and 46 thus provide portions of the container 10 raised above the path of the belt on each surface around which the belt passes that will protect the belt from abrasion during shipment.

Having thus described the present invention with reference to a preferred embodiment, it will be understood that minor modifications may be made therein without departing from the spirit and scope of the invention.

I claim:

1. A light-weight durable shipping-container for rectangular film cartridges comprising:
   a lower body piece formed with generally rectangular end wall and sidewalls bordering and extending generally perpendicularly from said end wall and having an inset embossed channel formed along the exterior of said end wall and two opposed sidewalls, midway of the length of said opposed sidewalls;
   a lower generally planar floor piece secured to said lower body piece end wall within said sidewalls and having embossed projecting generally rectangular perpendicularly intersecting ribs which divide said lower body piece into rectangular compartments, one of said ribs fitting over the raised rib formed in the interior of said body piece end wall by formation of said exteriorly embossed channel;
   a cover piece formed with a generally rectangular top wall having dimensions greater than the dimensions of said lower body piece end wall and having sidewalls bordering and extending generally perpendicularly from said end wall to be telescopically received over said body piece, and having inset embossed channels in the exterior of opposed sidewalls to fit slidably in the channel in the sidewalls of said body piece and having means for protectively retaining an address label on said cover piece within said container and visible through said top wall;
   an upper generally planar floor piece secured to a substantial portion of said cover piece top wall within said sidewalls and having embossed generally rectangular ribs which protrude therefrom into the cover to further define said compartments with the ribs of said lower floor piece when said cover piece is fitted on said body piece;
   a belt secured within said channel in said body piece end wall to surround said container; and
   means for releasably securing the ends of said belt to hold said container pieces telescoped.

2. A shipping container as recited in claim 1 wherein said means for protectively retaining an address label comprises a transparent panel secured to said top wall to cover an opening therein, said upper floor piece being secured to said top wall and having an aperture along one edge of said panel to define a pocket with said panel, whereby an address label may be inserted through the aperture in said upper floor piece to be protectively retained between said transparent panel and said upper floor piece.